(12) United States Patent
 Cook (10) Patent No.: US 10,586,366 B2
(45) Date of Patent: Mar. 10, 2020

(54) SYSTEM AND METHOD FOR DISPLAY OBJECT BITMAP CACHING

(71) Applicant: Electronic Arts Inc., Redwood City, CA (US)

(72) Inventor: Raymond Cook, Castro Valley, CA (US)

(73) Assignee: Electronics Arts Inc., Redwood City, CA (US)

( * ) Notice: Subject to any disclaimer, the term of this patent is extended or adjusted under 35 U.S.C. 154(b) by 0 days.

(21) Appl. No.: 15/817,615

(22) Filed: Nov. 20, 2017

(65) Prior Publication Data

US 2018/0075638 A1      Mar. 15, 2018

Related U.S. Application Data

(63) Continuation of application No. 13/644,644, filed on Oct. 4, 2012, now Pat. No. 9,846,958.

(51) Int. Cl.
| | |
|---|---|
| *G06T 13/00* | (2011.01) |
| *G06T 7/20* | (2017.01) |
| *G06T 7/00* | (2017.01) |
| *G06T 19/00* | (2011.01) |
| *G06T 11/00* | (2006.01) |
| *G06T 1/60* | (2006.01) |

(52) U.S. Cl.
CPC ............. *G06T 13/00* (2013.01); *G06T 1/60* (2013.01); *G06T 7/001* (2013.01); *G06T 7/20* (2013.01); *G06T 11/00* (2013.01); *G06T 19/006* (2013.01); *G06T 2207/20016* (2013.01); *G06T 2207/20021* (2013.01)

(58) Field of Classification Search
CPC . G06T 11/00; G06T 13/00; G06T 7/20; G06T 7/001; G06T 19/006
See application file for complete search history.

(56) References Cited

U.S. PATENT DOCUMENTS

| | | | |
|---|---|---|---|
| 5,727,220 A | 3/1998 | Hohensee | |
| 6,363,418 B1 | 3/2002 | Conboy | |
| 6,510,459 B2 | 1/2003 | Cronin, III | |
| 7,042,587 B2 | 5/2006 | Fiske | |
| 7,808,511 B2 * | 10/2010 | Opala | ........ G06F 3/14 345/428 |
| 7,925,100 B2 | 4/2011 | Howell | |
| 8,923,651 B2 | 12/2014 | Priddle | |
| 2002/0093506 A1 * | 7/2002 | Hobson | ........ G06F 3/14 345/553 |
| 2005/0041022 A1 | 2/2005 | Blot | |

(Continued)

*Primary Examiner* — Michael Le
(74) *Attorney, Agent, or Firm* — Knobbe, Martens, Olson & Bear, LLP (57) ABSTRACT

A system and method for recursively rendering, caching, and/or retrieving a display object bitmap is provided. In some implementations, an image may be rendered on a client computing platform using an image list of one or more bitmap objects. The one or more object bitmaps may be generated in response to obtaining information defining a vector image in an image frame in an animation. An image list may be maintained for an image to be rendered based on the vector image of a frame of animation and/or some or all of the frames in the animation. The image list may store one or more references to one or more respective bitmap objects that are associated with the image to be rendered.

20 Claims, 5 Drawing Sheets

(56) References Cited

U.S. PATENT DOCUMENTS

| | | | |
|---|---|---|---|
| 2005/0243097 A1 | 11/2005 | Cohen | |
| 2008/0273218 A1* | 11/2008 | Kitora | G06K 9/00463 358/1.13 |
| 2009/0037441 A1* | 2/2009 | Howell | G06T 9/00 |
| 2010/0111437 A1* | 5/2010 | Chen | G06K 9/48 382/266 |
| 2010/0172594 A1 | 7/2010 | Priddle | |
| 2011/0142334 A1* | 6/2011 | Abdo | G06K 9/00463 382/165 |
| 2012/0002899 A1 | 1/2012 | Orr, IV | |
| 2012/0105463 A1* | 5/2012 | McDowell | G06F 15/177 345/522 |
| 2013/0120401 A1* | 5/2013 | Borysenko | G06T 13/80 345/473 |
| 2013/0127856 A1 | 5/2013 | Winnemoeller | |

\* cited by examiner

SYSTEM AND METHOD FOR DISPLAY OBJECT BITMAP CACHING

FIELD

The disclosure relates to recursively rendering, caching, and/or retrieving a display object bitmap via a client computing platform.

BACKGROUND

Various techniques for rendering, caching, and/or retrieving a display object bitmap via a client computing platform are known. With high-performance flash technology, rendering systems that draw bitmap data to a screen may have higher performance. However, the use of bitmap data to draw a display object on a screen may present challenges. Bitmap data for a display object may be larger in file size than a corresponding vector alternative. Further, the use of bitmap data may stifle flexibility for the artists that generate the display objects to be displayed. Vector drawing tools available with Flash technology may provide greater flexibility to an artist generating an image.

Some conventional systems use blitting as an alternative to generating images via bitmap data. Blitting may allow for direct pixel copying to a bitmap. For example, an artist may generate an image using, for example, conventional vector drawing tools. The vector image may then be copied to a bitmap object using, for example, conventional blitting technology.

Conventional blitting technology, however, suffers from various drawbacks and inefficiencies. For example, the asset file size generated by conventional blitting technology is considerably larger than vector data. Correspondingly, conventional blitting technology may suffer inefficiencies similar to drawing bitmap data on the screen. Conventional blitting technologies may propagate inefficiencies in providing a quickly loaded game using only images. Further, conventional blitting techniques that enable the conversion of a vector image to a single bitmap object may result in an inability to scale the image while maintaining a resolution of the image. Conventional blitting techniques may also hinder an ability to edit individual parts of the image once it has been converted to a bitmap object.

SUMMARY

One aspect of the disclosure relates to recursively rendering, caching, and/or retrieving a display object bitmap. In some implementations, an image may be rendered on a client computing platform using an image list of one or more bitmap objects. The one or more object bitmaps may be generated in response to obtaining information defining a vector image in an image frame in an animation. An image list may be maintained for an image to be rendered based on the vector image of a frame of animation and/or some or all of the frames in the animation. The image list may store one or more references to one or more respective bitmap objects that are associated with the image to be rendered.

In some implementations, a reference to a bitmap object in the image list may comprise a position in the image at which the bitmap object is to be located and a location in a bitmap object cache at which the bitmap object may be stored. The bitmap object cache may cache one or more bitmap objects. For example, the bitmap cache may cache one or more bitmap objects associated with an image frame, associated with an animation, associated with one or more applications in which an animation may occur, associated with any images rendered on client computing platform, and/or associated with other uses of images or animations.

In some implementations, a bitmap object may comprise one or more of: bitmap data for the bitmap object, one or more references to other bitmap objects, and one or more references to child bitmap objects. A bitmap object may also include, for example, dimensions relating to a size of the bitmap object. A child bitmap object may comprise one or more of: bitmap data for the child bitmap object, one or more references to other child bitmap objects, and one or more references to grandchildren bitmap objects. A child bitmap object may also include, for example, dimensions relating to a size of the child object. A grandchild bitmap object (or great-grandchild bitmap object, or great-great grandchild bitmap object) may be comprised in a same or similar manner.

In some implementations, one or more bitmap objects may be generated based on a vector image. For example, one or more bitmap objects may be generated based on vector information defining a vector image in a frame in the animation. In some implementations, a color bound of a first object of the vector image may be detected. The vector information may be implemented to rasterize the detected first object within the color bound of the vector image and generate a bitmap object. The generated bitmap object may include bitmap data for the bitmap object. The generated bitmap object may comprise, for example, a rectangular shape. The object within the color bound may be displayed within the rectangular shape of the bitmap object. The bitmap data may correspond to some or all of the vector information associated with the detected first object of the vector image.

When the bitmap object is generated based on the vector information, the bitmap object may be compared with one or more cached bitmap objects in the bitmap object cache. In some implementations, the bitmap object may be compared with the one or more cached bitmap objects in the bitmap cache by comparing the bitmap data for the bitmap object with respective bitmap data of the one or more cached bitmap objects in the bitmap cache.

Responsive to the bitmap object matching a cached bitmap object, the image list may be augmented with a reference to the cached bitmap object. For example, the image list may be augmented with a position in the image at which the bitmap object is to be located and a location in the bitmap cache at which the cached bitmap object is stored. Bitmap data for the bitmap object may be discarded, as a cached bitmap object has been found to match the bitmap object generated from the detected object in the vector image.

When a bitmap object does not match a cached bitmap object in the bitmap cache, the bitmap object may be augmented with the bitmap data for the bitmap object. The bitmap object cache may then cache the bitmap object. After the bitmap object is cached, the image list may be augment with a reference to the cached bitmap object. For example, the image list may be augmented with a position in the image at which the bitmap object is to be located and a location in the bitmap cache at which the bitmap object is stored.

In some implementations, a non-transitory electronic storage media may store information related to an image. The stored information may comprise an image list configured to store one or more references to one or more respective bitmap objects associated with the image, a bitmap object cache configured to store one or more bitmap objects for the image, a bitmap object comprising one or more of: bitmap data, one or more references to other bitmap objects, or one or more references to child bitmap objects, a child bitmap object cache configured to store one or more child bitmap objects for a bitmap object, and instructions configured to cause a client computing platform to: obtain information defining a vector image in a frame in an animation, detect a color bound of a first object of the vector image, implement the vector information to rasterize the first object within the color bound of the vector image to generate a first bitmap object, compare the first bitmap object with one or more bitmap objects in a bitmap object cache, and responsive to the first bitmap object matching one of the one or more bitmap objects in the bitmap object cache, augment the image list with a reference to the cached one of the bitmap objects that matches the first bitmap object.

In some implementations, a bitmap object may be generated for some or all of the objects detected from an image in a frame in an animation. For example, a method for rendering an image for a client computing platform may comprise obtaining information defining a vector image in the frame in the animation, maintaining an image list configured to store one or more references to one or more respective bitmap objects associated with the vector image, a bitmap object comprising one or more of: bitmap data, one or more references to other bitmap objects, or one or more references to child bitmap objects, generating one or more bitmap objects from the vector image, caching, at a bitmap object cache, the one or more bitmap objects, generating one or more child bitmap objects from a first bitmap object of the one or more bitmap objects, caching, at a child bitmap object cache, the one or more child bitmap objects, and augmenting the first bitmap object with one or more references to one or more cached child bitmap objects. The method may be implemented in a computer system comprising one or more processors configured to execute computer program modules.

In some implementations, a non-transitory electronic storage media may store information related to an image. The stored information may comprise an image list configured to store one or more references to one or more respective bitmap objects associated with the image, a bitmap object comprising one or more of: bitmap data, one or more references to other bitmap objects, or one or more references to child bitmap objects, a bitmap object cache configured to store one or more bitmap objects for the image, a child bitmap object cache configured to store one or more child bitmap objects for a bitmap object, and instructions configured to cause a client computing platform to: obtain information defining a vector image in a frame in an animation, generate one or more bitmap objects from the vector image, cache, at a bitmap object cache, the one or more bitmap objects, generate one or more child bitmap objects from a first bitmap object of the one or more bitmap objects, cache, at a child bitmap object cache, the one or more child bitmap objects, and augment the first bitmap object with one or more references to one or more cached child bitmap objects.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
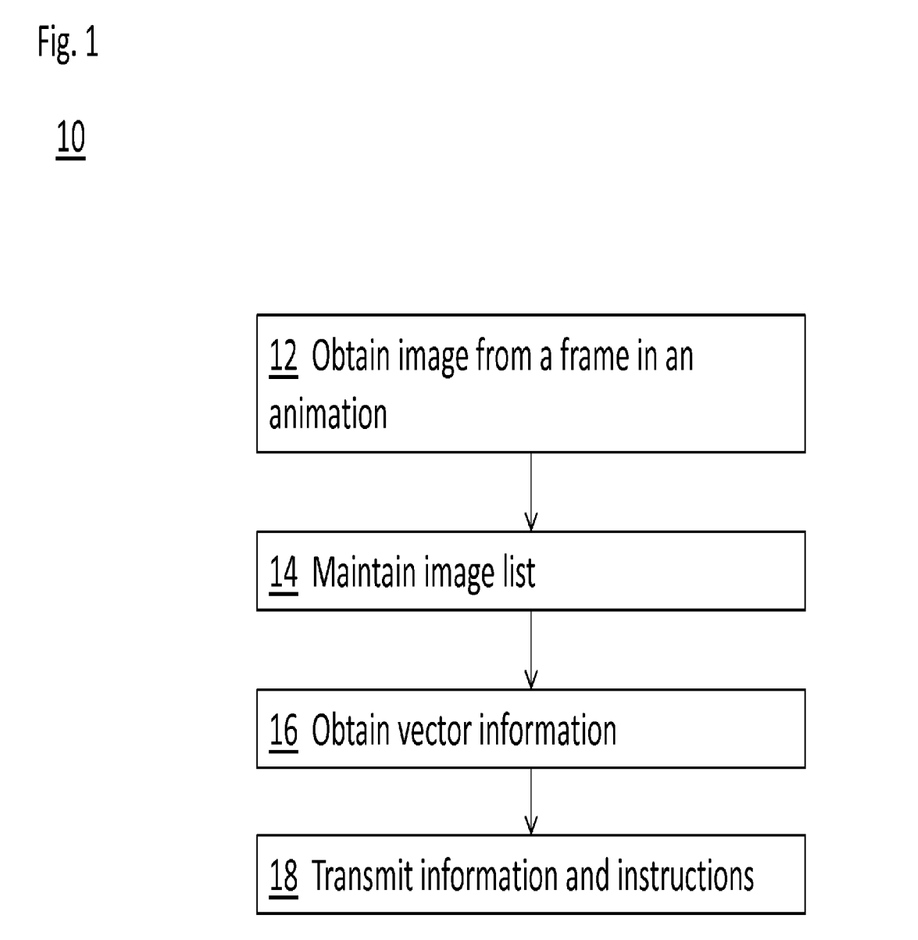
FIG. 1 illustrates an exemplary method of recursively rendering an image for a client computing platform, according to an aspect of the invention.

FIG. 1 illustrates an exemplary method 10 of recursively rendering an image for a client computing platform. The image may be an image from a frame in an animation. The method may include obtaining vector information of the image and generating a recursive list of bitmap objects to be rendered for the display of the image.

Method 10 may be performed, for example, as part of hosting an online game, hosting an online video, and/or providing other media to users over a network (e.g., the Internet and/or other networks). Method 10 may facilitate rendering and/or display of the image in a frame of animation on the client computing platform. For example, method 10 may reduce the resources (e.g., processing, storage, etc.) required on the client computing platform to assemble and/or display an image in a frame in an animation, may reduce the amount of information sent over the network to enable the client computing platform to assemble and/or display an image in a frame of the animation, and/or enhance other aspects of the transmission, retrieval, and/or display of the image.

At an operation 12, an image from a frame in an animation may be obtained. The image may define a visual appearance of a frame in an animation. The image information may include pixel information (e.g., defining color value for individual pixels), vector information (e.g., defining shapes and fill), and/or other types of image information. In some implementations, the image may be a vector image of a frame. The vector image may comprise one or more of vector data, a flash FLD compessed video stream, content embedded in a SWF file data, or F4v data. Obtaining the image information may include accessing stored image information, receiving image information over a network, receiving image information through a user interface, and/or obtaining the image information in other ways.

In an operation 14, an image list may be maintained in relation to the image and/or in relation to some or all of the animation. For example, the image list may be configured to store one or more references to one or more respective bitmap objects related to one or more images in one or more frames in an animation. In some implementations, the image list may be configured to store references to one or more bitmap objects associated with multiple animations.

In some implementations, a reference to a bitmap object in the image list may comprise a position in the image at which the bitmap object is to be located and a location in a bitmap object cache at which the bitmap object may be stored. The bitmap object cache may cache one or more bitmap objects. The bitmap object cache may cache one or more bitmap objects associated with an image frame, associated with an animation, associated with one or more applications in which an animation may occur, associated with any images rendered on client computing platform, and/or associated with other uses of images or animations.

In some implementations, a bitmap object may comprise one or more of: bitmap data for the bitmap object, one or more references to other bitmap objects, and one or more references to child bitmap objects. A bitmap object may also include, for example, dimensions related to a size of the bitmap object. A child bitmap object may comprise one or more of: bitmap data for the child bitmap object, one or more references to other child bitmap objects, and one or more references to grandchildren bitmap objects. A child bitmap object may also include, for example, dimensions related to a size of the child bitmap object. In some implementations, the one or more references to other child bitmap objects may be references to one or more respective child bitmap objects cached in the child bitmap object cache. In some implementations, the references to other child bitmap objects may be references to respective one or more bitmap objects cached in the bitmap object cache. A grandchild bitmap object (or great-grandchild bitmap object, or great-great grandchild bitmap object) may be comprised in a same or a similar manner. Grandchildren bitmap objects (or great-grandchildren bitmap objects) may be cached in a respective grandchild bitmap object cache (or great-grandchild bitmap cache) or may be cached in the bitmap object cache.

At an operation 16, vector information defining a vector image in the frame of the animation may be obtained. The vector information may be obtained from the received image. For example, the vector information may be obtained from image information that defines a visual appearance of a frame in an animation. In some implementations, the vector image may include or one more objects. The one or more objects in the vector may be delineated by respective color bounds in the vector. One or more of the objects in the vector may include one or more child objects. The one or more child objects may be delineated by respective color bounds within a color bound of the parent object. Obtaining the vector information may include receiving the vector information defining a vector image in a frame in an animation over a network, accessing stored vector information, receiving vector information through a user interface, determining vector information through image information obtained at an operation 12, and/or obtaining the vector information in other ways.

At an operation 18, one or more bitmap objects may be generated from the obtained vector information. At operation 18, instructions may be transmitted to the client computing device. The instructions may be configured to cause the client computing platform to generate one or more bitmap objects from the obtained vector information. In some implementations, the vector information may be implemented to rasterize an object detected in the vector information. For example, the object may be detected by detecting the color bound of the object of the vector image. Implementing vector information to rasterize an object may be done in a variety of ways that are known to persons of skill in the art. Rasterizing the vector information to generate the bitmap object may be implemented by known methods. The rasterized object may be the bitmap object.

In some implementations, one or more bitmap objects may be generated from a vector image in a frame in an animation. For example, one or more bitmap objects may be generated based on vector information defining a vector image in a frame in the animation. In some implementations, a color bound of an object of the vector image may be detected. The vector information may be implemented to rasterize the detected object within the color bound of the vector image to generate a bitmap object. The generated bitmap object may include bitmap data for the bitmap object. The generated bitmap object may comprise, for example, a rectangular shape. The object within the color bound may be displayed within the rectangular shape of the bitmap object. The bitmap data may correspond to some or all of the vector information associated with the detected object of the vector image.

The bitmap object may then be compared to one or more objects in a bitmap cache. In some implementations, the bitmap object may be compared with one or more cached bitmap objects in the bitmap object cache. In some implementations, the bitmap object may be compared with the one or more cached bitmap objects in the bitmap object cache by comparing the bitmap data for the bitmap object with respective bitmap data of the one or more cached bitmap objects in the bitmap cache.

Responsive to the bitmap object matching a cached bitmap object, the image list may be augmented with a reference to the cached bitmap object. For example, the image list may be augmented with a position in the image at which the bitmap object is to be located and a location in the bitmap cache at which the cached bitmap object is stored. In some implementations, responsive to the child bitmap object matching one of the one or more cached child bitmap objects associated with the cached bitmap object, the bitmap object may be augmented with the cached one of the child bitmap objects that matches the child bitmap object. For example, the bitmap object may be augmented with a reference to a location of the cached child bitmap object in the child bitmap object cache and a location in the bitmap object at which the bitmap data of the cached child bitmap object is to be located. Bitmap data associated the child bitmap object may be discarded, as a cached child bitmap object has been found to match the child bitmap object generated from the bitmap object detected in the vector image. Bitmap data for the bitmap object may also be discarded, as a cached bitmap object has been found to match the bitmap object generated from the detected object in the vector image.

When the bitmap object does not match a cached bitmap object, the bitmap object may be augmented with the bitmap data for the bitmap object. The bitmap object cache may then cache the bitmap object. After the bitmap object is cached, the image list may be augmented with a reference to the newly cached bitmap object. For example, the image list may be augmented with a position in the image at which the bitmap object is to be located and a location in the bitmap cache at which the bitmap object is cached.

In some implementations, a bitmap object may be generated for some or all of the objects detected from an image in a frame in an animation.

Figure 2:
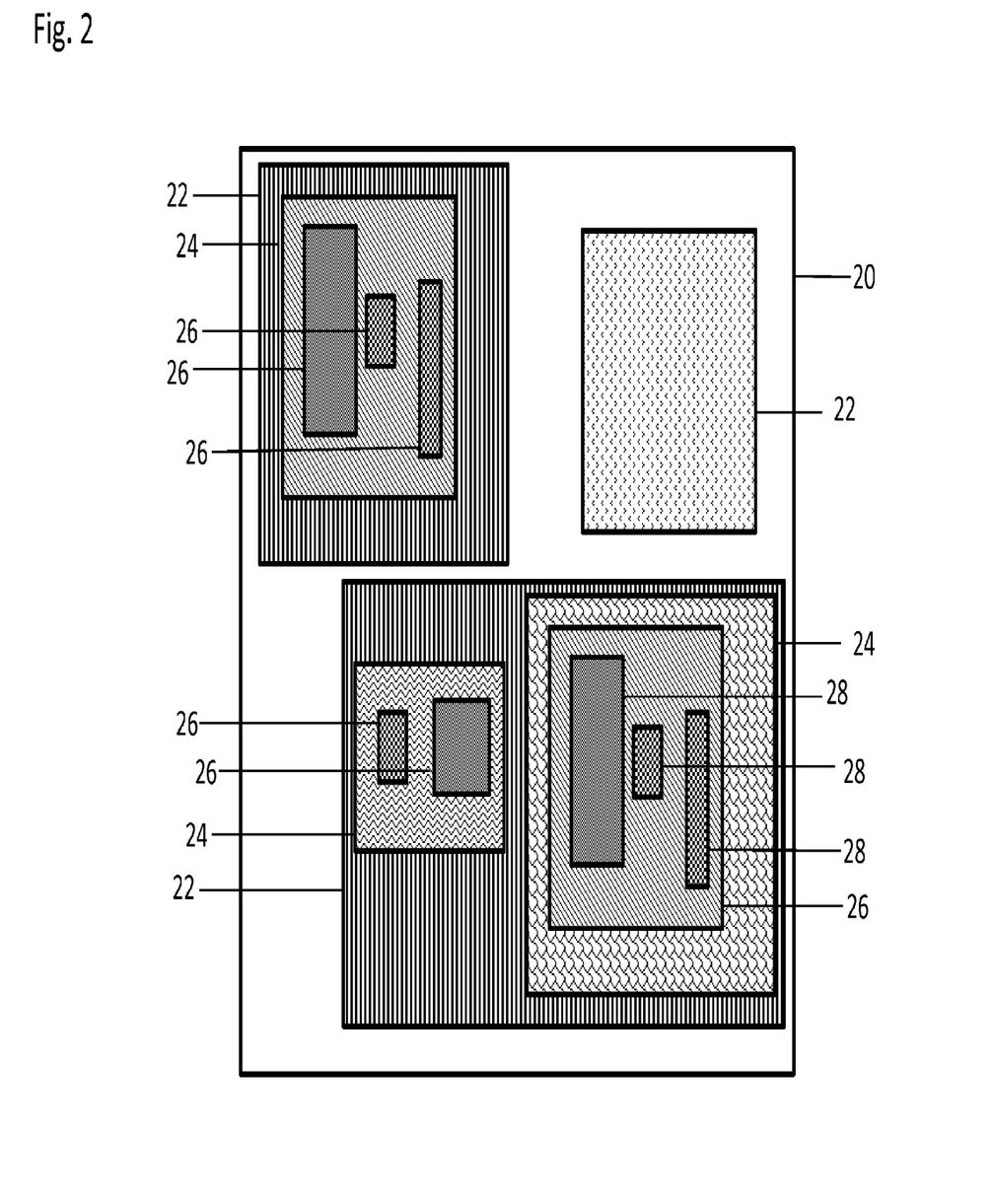
FIG. 2 illustrates an exemplary delineation of bitmap objects in a vector image.

By way of illustration, FIG. 2 illustrates an exemplary delineation of bitmap objects in a vector image. FIG. 2 depicts a vector image 20, one or more bitmap objects 22, one or more child bitmap objects 24, one or more grandchild bitmap objects 26, one or more great-grandchild bitmap objects 28, and/or other visual objects delineated in the vector image 20. As is described herein, one or more bitmap objects 22, one or more child bitmap objects 24, one or more grandchild bitmap objects 26, one or more great-grandchild bitmap objects 28, and/or other visual objects delineated in the vector image 20 may be rendered to display an image relating to a frame in an animation.

Figure 3:
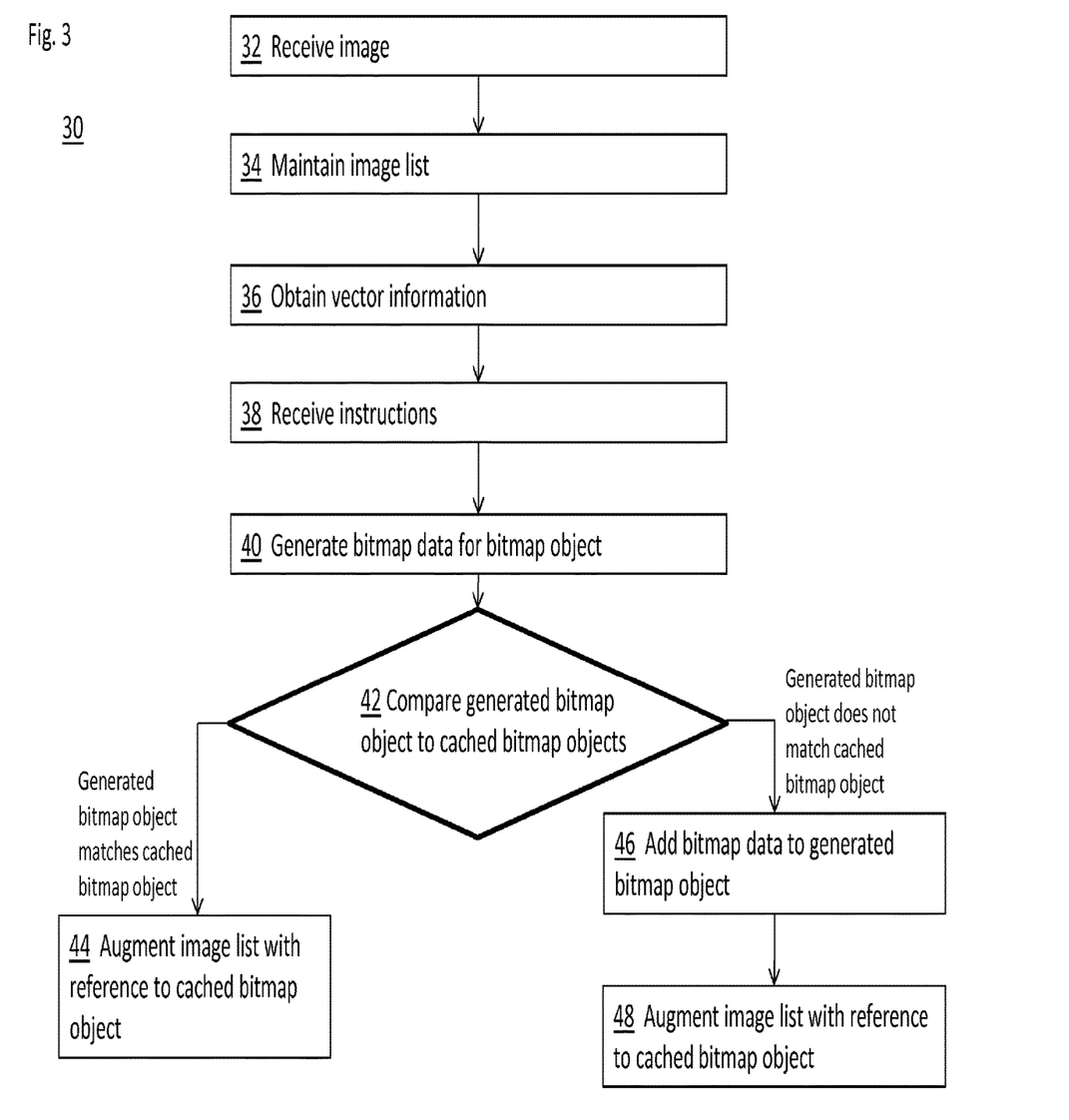
FIG. 3 illustrates an exemplary method of recursively rendering an image for a client computing platform, according to an aspect of the invention.

FIG. 3 illustrates an exemplary method 30 of recursively rendering an image for a client computing platform. The image may be an image from a frame in an animation, such as image 20. The method may include obtaining vector information of the image and generating a recursive list of bitmap objects to be rendered for the display of the image. Method 30 may be implemented on a client computing platform configured to recursively render one or more bitmap objects based on an image in a frame in an animation.

At an operation 32, an image may be received. For example, the image may be received over a network. The image may be same or of a similar type to the image discussed with respect to operation 12.

At an operation 34, an image list may be maintained. In some implementations, the image list may be received over a network. The received image list may be compared to an image list maintained at the client computing platform. When the received image list is more recent than the maintained image list, the maintained image list may be replaced by the received image list. An image list may be considered more recent based on one or more criteria. For example, a first image list may be considered more recent than a second image list when the first image list contains more items, has a newer date, has a newer time stamp, and/or based on other criteria. The image list may be a same or of a similar type to the image list described with respect to operation 14.

At an operation 36, vector information defining a vector image in the frame of the animation may be obtained. The vector information may be obtained in a manner similar or the same as that described with respect to operation 16.

At an operation 38, instructions configured to cause the client computing platform to generate one or more bitmap objects based on the obtained vector information may be obtained. The instructions may be configured to cause the client computing platform to generate one or more bitmap objects from the obtained vector information. In some implementations, the instructions may cause the client computing platform to generate one or more bitmap objects, one or more child bitmap objects, one or more grandchild bitmap objects, and/or other types of bitmap objects based on color bounds of objects of the obtained vector information like that illustrated in FIG. 2 and described herein.

At an operation 40, bitmap data for a bitmap object may be generated based on the vector information. In some implementations, the vector information may be implemented to rasterize an object detected in the vector information. For example, the object may be detected by detecting a color bound of the object of the vector image. Implementing vector information to rasterize an object may be done in a variety of ways that are known to persons of skill in the art. For example, rasterizing the vector information to generate the bitmap object may be implemented by known methods. The rasterized object may comprise bitmap data for the bitmap object. The generated bitmap object may comprise, for example, a rectangular shape. The object within the color bound may be displayed within the rectangular shape of the bitmap object.

The bitmap data may correspond to some or all of the vector information associated with the detected first object of the vector image. In some implementations, the bitmap data may be cropped such that one or more pixels of the bitmap data that match respective one or more pixels of the vector image are removed from the bitmap object. The bitmap data may be cropped before comparison with bitmap data of other objects and/or before storage of the bitmap object in the bitmap object cache.

In an operation 42, the bitmap object may be compared to one or more objects in a bitmap cache. In some implementations, the bitmap object may be compared with one or more cached bitmap objects in the bitmap object cache. In some implementations, the bitmap object may be compared with the one or more cached bitmap objects in the bitmap cache by comparing the bitmap data for the bitmap object with respective bitmap data of the one or more cached bitmap objects in the bitmap cache.

When the cached bitmap object does not include a reference to another cached bitmap object, the bitmap data of the cached bitmap object is compared to the bitmap data of the bitmap object. In some implementations, when the cached bitmap object includes a reference to one or more other cached bitmap objects, the bitmap data associated with the cached bitmap object may be retrieved for comparison to the bitmap data of the bitmap object.

When the cached bitmap data includes a reference to one or more other cached bitmap objects, the bitmap data associated with the cached bitmap object and any child bitmap data associated with the cached bitmap object may be retrieved. For example, the bitmap data for the cached child bitmap may be included with the bitmap data for the cached bitmap object at a location at the cached bitmap object indicated by the reference for the child object in the cached bitmap object. The bitmap data for the cached child bitmap may be interposed with the bitmap data for the cached bitmap data at the location indicated in the reference to the cached child bitmap object in the bitmap object. Alternatively, the bitmap data for the cached child bitmap object may be combined with bitmap data for the cached bitmap object at the indicated location. Other methods of retrieving the bitmap data of the cached bitmap object and the one or more cached child bitmap objects may be performed as well. Bitmap data associated with the child bitmap data may be retrieved in a manner similar to the retrieval of data for the cached bitmap object. The retrieved bitmap data for the cached bitmap data may include bitmap data associated with the cached bitmap object and any retrieved child bitmap data of child bitmap objects referenced by the cached bitmap object. In some implementations, the comparison of the bitmap object with the cached bitmap object may comprise a comparison of the bitmap data of the bitmap object with the retrieved bitmap data for the cached bitmap object.

In some implementations, when some or all of the bitmap data of the bitmap object matches some or all of the data of a cached bitmap object, one or more child objects of the bitmap object may be compared with respective child objects of the cached bitmap object. One or more child objects of the bitmap object may be detected within the bitmap object. For example, one or more child objects of the bitmap object may be detected by respective color bounds of the one or more child objects. In some implementations, the obtained vector information may be implemented to rasterize a child object and generate a respective child bitmap object. The child bitmap object may be compared with a cached child bitmap object. In one example, the child bitmap object and the cached child bitmap object may be compared in a manner similar to the comparison of the bitmap object and the cached bitmap object. In another example, a location of the child bitmap object in the bitmap object may be compared with a location of the cached child bitmap object in the cached bitmap object. The location of the cached child bitmap object may be indicated by the reference to the cached child bitmap object in the cached bitmap object.

When the cached bitmap object does not reference any child bitmap objects at the location at which the child bitmap object is located with respect to the bitmap object, the bitmap object and the cached bitmap object may not match. When the location does match, bitmap data of the child bitmap object is compared with bitmap data of the cached child bitmap data. For example, the bitmap data of the cached child bitmap object may be compared to the bitmap data of the child bitmap object in a manner similar to that described above. When the child bitmap object comprises grandchildren bitmap objects, the one or more grandchild bitmap objects may be compared with corresponding cached grandchildren bitmap objects associated with the cached bitmap object in a manner similar to the comparison of the child bitmap object and the cached child bitmap object.

At an operation 44, responsive to the bitmap object matching a cached bitmap object, the image list may be augmented with a reference to the cached bitmap object. For example, the image list may be augmented with a position in the image at which the bitmap object is to be located and a location in the bitmap cache at which the cached bitmap object is stored. In some implementations, responsive to the child bitmap object matching one of the one or more cached child bitmap objects associated with the cached bitmap object, the bitmap object may be augmented with the cached one of the child bitmap objects that matches the child bitmap object. For example, the bitmap object may be augmented with a reference to a location of the cached child bitmap object in the child bitmap object cache and a location in the bitmap object at which the bitmap data of the cached child bitmap object is to be located. Bitmap data associated the child bitmap object may be discarded, as a cached child bitmap object matches the child bitmap object generated from the bitmap object detected in the vector image. Bitmap data for the bitmap object may also be discarded, as a cached bitmap object has been found to match the bitmap object generated from the detected object in the vector image.

At an operation 46, when the bitmap object does not match a cached bitmap object, the bitmap object may be augmented with the bitmap data for the bitmap object. The bitmap object cache may then cache the bitmap object.

At an operation 48, after the bitmap object is cached, the image list may be augmented with a reference to the newly cached bitmap object. For example, the image list may be augmented with a position in the image at which the bitmap object is to be located and a location in the bitmap cache at which the bitmap object is cached.

In some implementations, a bitmap object may be generated for some or all of the objects detected from an image in a frame in an animation.

Figure 4:
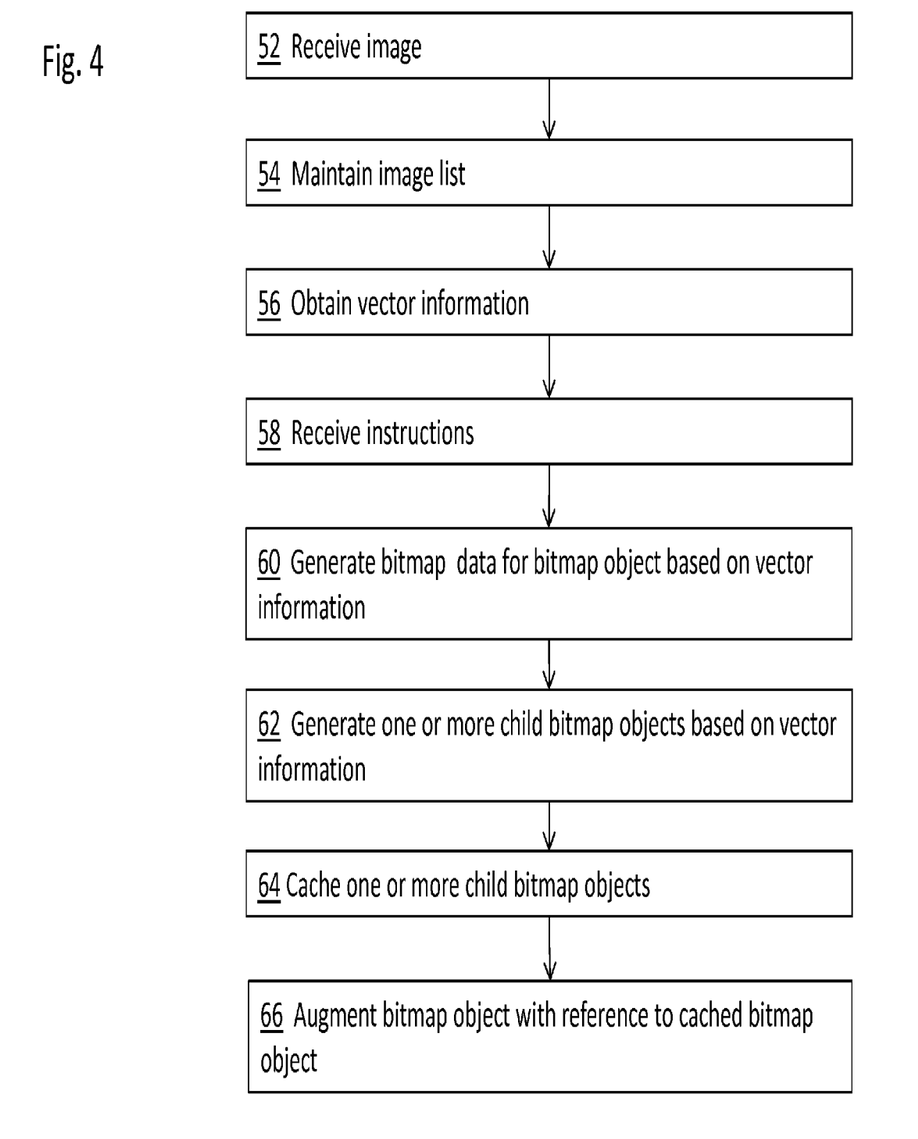
FIG. 4 illustrates an exemplary method of recursively rendering an image for a client computing platform, according to an aspect of the invention.

FIG. 4 illustrates an exemplary method 50 of recursively rendering an image for a client computing platform. The image may be an image from a frame in an animation, such as image 20. The method 50 may include obtaining vector information of the image and generating a recursive list of bitmap objects to be rendered for the display of the image. Method 50 may be implemented on a client computing platform configured to recursively render one or more bitmap objects based on an image in a frame in an animation.

At an operation 52, an image may be received. For example, the image may be received over a network. The image may be same or of a similar type to the image discussed with respect to operations 12 and/or 32.

At an operation 54, an image list may be maintained. The image list may be received and maintained in a manner similar to that discussed with respect to operations 14 and/or 34. The image list may be a same or of a similar type to the image list described with respect to operations 14 and/34.

At an operation 56, vector information defining a vector image in the frame of the animation may be obtained. The vector information may be obtained in a manner similar or the same as that described with respect to operations 16 and/or 36.

At an operation 58, instructions configured to cause the client computing platform to generate one or more bitmap objects based on the obtained vector information may be obtained. The instructions may be configured to cause the client computing platform to generate one or more bitmap objects from the obtained vector information. In some implementations, the instructions may cause the client computing platform to generate one or more bitmap objects, one or more child bitmap objects, one or more grandchild bitmap objects, and/or other types of bitmap objects based on color bounds of obtained vector information relating to an image, such as the image 20 illustrated in FIG. 2 and described herein.

At an operation 60, bitmap data for a bitmap object may be generated based on the vector information. In some implementations, bitmap data for the bitmap object may be generated in a same or similar manner as described with respect to operation 40.

At an operation 62, one or more child bitmap objects may be generated based on the obtained vector information. In some implementations, the child bitmap objects may be generated based on a color bound within a color bound of the object in the vector information that is associated with the bitmap object. The obtained vector information may be implemented to rasterize the child object and generate a child bitmap object. In other implementations, a color bound of an object may be detected in the bitmap data associated with the bitmap object.

In some implementations, the child bitmap data of the child bitmap object may be cropped such that one or more pixels of the child bitmap object that match respective one or more pixels of the bitmap object are removed from the child bitmap data. The child bitmap bitmap data may be cropped before comparison with child bitmap bitmap data of other objects and/or before storage of the child bitmap object in the child bitmap object cache.

At an operation 64, the child bitmap object may be cached. In some implementations, the child bitmap object may first be compared with one or more cached child bitmap objects in the child bitmap object cache. This comparison may be similar to the comparison described with respect to operation 42 and described above. Responsive to the child bitmap object matching a cached child bitmap object, the bitmap object may be augmented with a reference to the cached child bitmap object and a location within the bitmap object at which the child bitmap object is located. When the child bitmap object does not match a cached child bitmap object, the child bitmap object is added to the child bitmap object cache. The bitmap object is augmented with a reference to the newly cached child bitmap object and a location within the bitmap object at which the child bitmap object is located.

At an operation 66, the image list may be augmented with a reference to a cached bitmap object associated with the bitmap object. In some implementations, the bitmap object may be compared with one or more cached bitmap objects in the bitmap object cache. This comparison may be similar to the comparison described with respect to operation 42 and described above. Responsive to the bitmap object matching a cached bitmap object, the image list may be augmented with a reference to the cached bitmap object and a location within the vector image at which the bitmap object is located. When the bitmap object does not match a child bitmap object, the bitmap object is added to the bitmap object cache. The image list is augmented with a reference to the newly cached bitmap object and a location within the vector image at which the bitmap object is located.

The operations of methods 10, 30 and 50 presented herein are intended to be illustrative. In some implementations, methods 10, 30 and/or 50 may be accomplished with one or more additional operations not described, and/or without one or more of the operations discussed. Additionally, the order in which the operations of methods 10, 30 and/or 50 are illustrated in FIGS. 1, 3 and/or 4 and described herein is not intended to be limiting.

In some implementations, methods 10, 30 and/or 50 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 10, 30 and/or 50 in response to instructions stored electronically on an electronic storage medium. The one or more processing devices may include one or more devices configured through hardware, firmware, and/or software to be specifically designed for execution of one or more of the operations of methods 10, 30 and/or 50.

Figure 5:
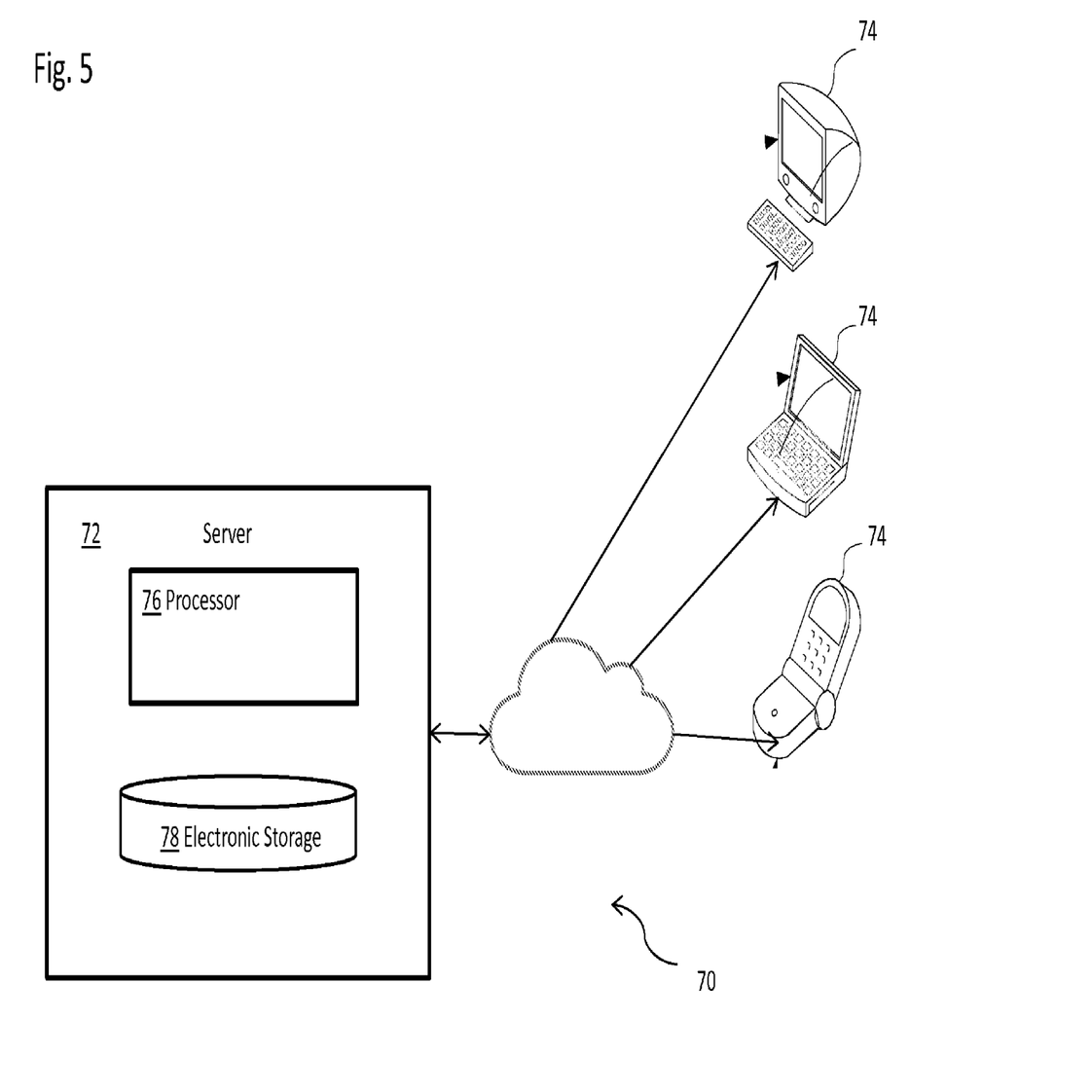
FIG. 5 illustrates a system configured to generate, transmit, and/or present a recursively rendered image for a client computing platform.

FIG. 5 illustrates a system 70 configured to generate and present a recursively rendered image to users. As can be seen in FIG. 5, system 70 may include one or more of a server 72, one or more client computing devices 74, and/or other components.

Server 72 may be configured to communicate with client computing devices 74 in a server/client architecture. By way of non-limiting example, server 72 may be configured to host an online game, a virtual space, an online video, and/or other content. The content hosted by server 72 may include an animation and/or an animation sequence served to client computing devices 74 by server 72. Server 72 may include one or more processors 76, electronic storage 78, and/or other components.

Processor 76 may provide information processing capabilities within server 72. Although processor 76 is shown in FIG. 5 as a single entity, this is not intended to be limiting, as processor 76 may include a plurality of processors operating in coordination or cooperation. This may include implementations in which server 72 includes multi-processor device, a farm of server devices operating together, and/or virtual resources provided by the cloud. Processor 76 may be configured to provide information to client computing platforms 74 over a network that causes client computing platforms to recursively render one or more bitmap objects from an image in a frame in an animation. For example, processor 76 may be configured to perform some or all of the functionality described herein with respect to method 10 (shown in FIG. 1).

Electronic storage 78 may electronic storage media that electronically stores information non-transiently. The electronic storage media of electronic storage 78 may include one or both of system storage that is provided integrally (i.e., substantially non-removable) with server 72 and/or removable storage that is removably connectable to server 72 via, for example, a port (e.g., a USB port, a firewire port, etc.) or a drive (e.g., a disk drive, etc.). Electronic storage 78 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 78 may include virtual storage resources, such as storage resources provided via a cloud and/or a virtual private network. Electronic storage 78 may store software algorithms, information determined by processor 76, information received from client computing platforms 74, and/or other information that enables server 72 to function properly.

Electronic storage 78 may non-transiently store information prior to transmission to client computing platforms 74 that causes client computing platforms to present the recursively rendered image to users. For example, such information may include image information (e.g., as obtained at operations 12, 32, and/or 52 as shown in FIGS. 1, 3, and 4, and described herein), a bitmap object cache (e.g., as described herein), instructions for recursively rendering one or more bitmap objects from an image in a frame in an animation (e.g., as described with respect to operations shown in FIGS. 1, 3, and 4, and described herein), and/or other information.

Client computing platforms 74 may be computing platforms configured to provide an interface with users and system 70. A given client computing platform 74 may include one or more processors, electronic storage that non-transiently stores information, and/or other components. By way of non-limiting example, the given client computing platform may include one or more of a smartphone, a handheld computer, a tablet device, a personal digital assistant, a laptop computer, a desktop computer, and/or other platforms. In presenting the animation to a user, the given client computing platform 74 may be configured to perform some or all of the functionality described herein with respect to method 30 shown in FIG. 3 and/or method 50 shown in FIG. 4.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A computer-implemented method of rendering an image comprising:
   obtaining vector data that defines a vector image, wherein the vector image corresponds to a frame in an animation;
   generating a first bitmap object from the vector image, wherein the first bitmap object matches a first object located within the vector image, wherein said generating the first bitmap object comprises:

detecting an outer boundary of the first object based at least in part on an identification of a color distinction between the first object and content which is adjacent to the first object, and based at least in part on the outer boundary of the first object, rasterizing the first object separate from other areas of the vector image;

generating a child bitmap object from the vector image, wherein the child bitmap object matches a second object located within the first object located within the vector image, wherein said generating the child bitmap object comprises:

detecting an outer boundary of the second object based at least in part on an identification of a color distinction between the second object and content which is adjacent to the second object, and based at least in part on the outer boundary of the second object, rasterizing the second object separate from other areas of the vector image;

comparing the child bitmap object with one or more cached bitmap objects in a bitmap object cache to identify whether a cached bitmap object from the one or more cached bitmap objects matches the child bitmap object; and updating an image list that is associated with the vector image to include a reference to the child bitmap object.

2. The computer-implemented method of claim 1, wherein:

said generating the child bitmap object further comprises generating bitmap data for the child bitmap object; and said comparing comprises comparing the bitmap data for the child bitmap object with bitmap data for the one or more cached bitmap objects in the bitmap object cache.

3. The computer-implemented method of claim 2, further comprising:

determining, based at least in part on said comparing, that the bitmap data does not match the bitmap data of any of the one or more cached bitmap objects in the bitmap object cache;

augmenting the child bitmap object with the bitmap data; and storing the child bitmap object in the bitmap object cache.

4. The computer-implemented method of claim 1, further comprising:

determining, based at least in part on said comparing, that the child bitmap object does not match any of the one or more cached bitmap objects in the bitmap object cache; and storing the child bitmap object in the bitmap object cache.

5. The computer-implemented method of claim 1, further comprising:

associating the first bitmap object with a reference to the reference child bitmap object.

6. The computer-implemented method of claim 1, further comprising:

determining that the child bitmap object does not match any of the one or more cached bitmap objects in the bitmap object cache; and storing the child bitmap object in the bitmap object cache.

7. The computer-implemented method of claim 1, wherein the reference to the child bitmap object comprises at least one of a position in the vector image to which the child bitmap object corresponds, or a location in the bitmap object cache at which the cached bitmap object is stored.

8. A non-transitory computer readable medium comprising computer-executable instructions for rendering an image, the computer-executable instructions, when executed by one or more processors, cause the one or more processors to:

obtain vector data that defines a vector image, wherein the vector image corresponds to a frame in an animation;

generate a first bitmap object from the vector image, wherein the first bitmap object corresponds to a first object located within the vector image, wherein to generate the first bitmap object, one or more processors are configured to:

detect an outer boundary of the first object based at least in part on an identification of a color distinction between the first object and content which is adjacent to the first object, and rasterize the first object separate from other areas of the vector image;

generate a child bitmap object from the vector image, wherein the child bitmap object matches a second object located within the first object located within the vector image, wherein to generate the child bitmap object, the one or more processors are configured to:

detect an outer boundary of the second object based at least in part on an identification of a color distinction between the second object and content which is adjacent to the second object, and based at least in part on the outer boundary of the second object, rasterizing the second object separate from other areas of the vector image;

compare the child bitmap object with one or more cached bitmap objects in a bitmap object cache to identify a cached bitmap object from the one or more cached bitmap objects that matches the child bitmap object; and update an image list that is associated with the vector image to include a reference to the child bitmap object.

9. The non-transitory computer readable medium of claim 8, wherein to generate the child bitmap object, the one or more processors generate bitmap data for the child bitmap object, wherein to compare the child bitmap object, the one or more processors compare the bitmap data for the child bitmap object with bitmap data for the one or more cached bitmap objects in the bitmap object cache.

10. The non-transitory computer readable medium of claim 9, wherein the computer-executable instructions further cause the one or more processors to:

determine, based at least in part on the comparison, that the bitmap data does not match the bitmap data of any of the one or more cached bitmap objects in the bitmap object cache;

augment the child bitmap object with the bitmap data; and store the child bitmap object in the bitmap object cache.

11. The non-transitory computer readable medium of claim 8, wherein the computer-executable instructions further cause the one or more processors to:

determine, based at least in part on the comparison, that the child bitmap object does not match any of the one or more cached bitmap objects in the bitmap object cache; and store the child bitmap object in the bitmap object cache.

12. The non-transitory computer readable medium of claim 8, wherein the computer-executable instructions further cause the one or more processors to:

associate the child bitmap object with a reference to a cached second bitmap object of the one or more bitmap objects that matches the child bitmap object.

13. The non-transitory computer readable medium of claim 12, wherein the computer-executable instructions further cause the one or more processors to:
   store the child bitmap object in the bitmap object cache; and
   associate the first bitmap object with a reference to the cached bitmap object that matches the child bitmap object.

14. The non-transitory computer readable medium of claim 8, wherein the reference to the child bitmap object comprises at least one of a position in the vector image to which the child bitmap object corresponds, or a location in the bitmap object cache at which the cached bitmap object is stored.

15. A computer-implemented method of rendering a bitmap image comprising:
   obtaining vector data that corresponds to a vector image of a frame in an animation;
   identifying a first object within the vector image based at least in part on an identification of a color distinction between a boundary of the first object and content which is adjacent to the boundary of the first object;
   based at least in part on said identifying the first object, rasterizing only the first object to generate a first bitmap object from the vector image, wherein the first bitmap object corresponds to the first object within the vector image;
   identifying a child object within the first object of the vector image based at least in part on an identification of a color distinction between a boundary of the child object and content which is adjacent to the boundary of the child object;
   based at least in part on said identifying the child object, rasterizing only the child object to generate a child bitmap object from the vector image, wherein the child bitmap object corresponds to the child object within the first object of the vector image; and
   updating an image list that is associated with the vector image to include a reference associated with the first bitmap object.

16. The computer-implemented method of claim 15, wherein the reference associated with the first bitmap object comprises at least one of a position in the vector image to which the first bitmap object corresponds, or a location in a bitmap object cache at which the first bitmap object is stored.

17. The computer-implemented method of claim 15, further comprising:
   comparing the first bitmap object with one or more cached bitmap objects in a bitmap object cache; and
   storing the first bitmap object in a bitmap object cache based at least in part on a determination that the first bitmap object does not match any of the one or more cached bitmap objects in the bitmap object cache.

18. The computer-implemented method of claim 15, further comprising:
   comparing the first bitmap object with one or more cached bitmap objects in the bitmap object cache,
   wherein said updating the image list is based at least in part on a determination that the first bitmap object does matches one of the one or more cached bitmap objects in a bitmap object cache.

19. The computer-implemented method of claim 15, further comprising:
   associating the first bitmap object with a reference to a cached bitmap object that matches the child bitmap object.

20. The computer-implemented method of claim 15, further comprising:
   updating the image list to include a reference associated with the child bitmap object.

* * * * *